United States Patent
Iwatsubo et al.

(10) Patent No.: US 6,303,904 B1
(45) Date of Patent: Oct. 16, 2001

(54) WELD MATERIAL, GAS METAL ARC WELDING METHOD, AND WELDED STRUCTURE

(75) Inventors: Kiyotaka Iwatsubo; Toshimitsu Tetsui; Takayuki Kawano; Hideharu Kobayashi; Youzaburo Mabuchi; Hiroshi Tsurusaki, all of Nagasaki; Tamao Takatsu; Teiichiro Saito, both of Hamakita; Takashi Inami, Fukuoka, all of (JP)

(73) Assignees: Mitsubishi Heavy Industries, Ltd.; Nippon Welding Rod Co., Ltd., both of Tokyo (JP)

( * ) Notice: Subject to any disclaimer, the term of this patent is extended or adjusted under 35 U.S.C. 154(b) by 0 days.

(21) Appl. No.: 09/755,022

(22) Filed: Jan. 8, 2001

(30) Foreign Application Priority Data

Feb. 7, 2000 (JP) .................. 12-029582

(51) Int. Cl.7 ................................ B23K 9/00
(52) U.S. Cl. ............ 219/137 WM; 219/137 R; 219/136; 219/73; 219/73.1; 420/40
(58) Field of Search ................... 219/137 WM, 219/137 R, 136, 73, 73.1; 420/40

(56) References Cited

U.S. PATENT DOCUMENTS 5,945,064 * 8/1999 Komai et al. .................. 420/40

FOREIGN PATENT DOCUMENTS

| 2-280993 | 11/1990 | (JP) . |
| 7-204885 | 8/1995 | (JP) . |
| 7-268563 | 10/1995 | (JP) . |
| 8-294793 | 11/1996 | (JP) . |
| 9-122971 | 5/1997 | (JP) . |

\* cited by examiner

Primary Examiner—M. Alexandra Elve
(74) Attorney, Agent, or Firm—Armstrong, Westerman, Hattori, McLeland & Naughton LLP

(57) ABSTRACT

An object of the present invention is to provide a weld material which contains 8 to 13% Cr, and can be used with the GMA welding method, a GMA welding method which has superior arc stability and can provide a welded material having superior properties, and a welded structure; in order to attain this object, a weld material is provided, which contains in weight, 0.01 to 0.15% C, 0.1 to 0.6% Si, 0.1 to 2.0% Mn, 8 to 13% Cr, 0.1 to 1.5% Ni, 0.3 to 2.0% Mo, 0.05 to 0.5% V, 0.08 to 0.5% W, 0.5 to 5.0% Co, 0.1 to 0.5% Ta, $\leq$0.08 N, 0.01 to 0.1% REMs, and consisting of the balance Fe with inevitable impurities.

10 Claims, 1 Drawing Sheet

WELD MATERIAL, GAS METAL ARC WELDING METHOD, AND WELDED STRUCTURE

BACKGROUND OF THE INVENTION

1. Field of the Invention

The present invention relates to a weld material, in particular to a steel which contains Cr in a range from 8 to 13%, has high intensity at high temperatures, and is suitable for a gas metal arc welding, a gas metal arc welding method, and a welded structure.

This application is based on the Japanese Patent Application No. Hei 12-29582, the contents of which are incorporated herein by reference.

2. Description of the Related Art

Recently, there is a tendency for generator boilers to be used under conditions in which the temperature and pressure are high, in order to increase their efficiency. Therefore, high Cr steels having high intensity at high temperatures, such as 9 Cr steel and 12 Cr steel, have been tested as the materials for constructing generator boilers. When high Cr steel is used for generator boilers, it is extremely important to select the best welding method for the high Cr steel.

Several high Cr steels, which can be welded by a shielded metal arc welding method, and a TIG (tungsten inert gas) welding method, have been used. For example, the Japanese Unexamined Patent Application, First publication No. Hei 02-280993 discloses a weld material containing of 0.01 to 0.1% C, 0.01 to 1% Si, 0.01 to 2.0% Mn, 8 to 12% Cr, 1 to 5% Ni, 0.1 to 3.0% Mo, 0.1 to 0.5% V, 0.1 to 3% W, 0.01 to 0.2% Nb, $\leq$0.04% Al, 0.003 to 0.08% N, $\leq$0.01% O, 0.0005 to 0.01% Ca, and consisting of the balance Fe with inevitable impurities, and of which the Cr equivalent (Cr eq.= Cr+6Si+4Mo+1.5 W+11V+5Nb+12Al−40C−30N−4Ni−2Mn (%)) is 13% or less and Qc (Qc=C+Mn/20+Si/30 (%)) is 0.15% or less.

Moreover, the Japanese Patent Application, First publication No. Hei 07-268563 discloses a weld material containing 0.03 to 0.12% C, 0.01 to 0.3% Si, 0.3 to 1.5% Mn, 8 to 13% Cr, 1 to 5% Ni, 0.3 to 1.6% Mo, 0.03 to 0.40% V, 0.5 to 3.5% W, 0.01 to 0.15% Nb, 0.01 to 0.08% N, and the balance Fe with inevitable impurities, also containing at least either of 1.0 to 5.0% Co and 0.5 to 4.0% Cu, and the contents of Mo, W, Co and Cu satisfy the relationship in (Mo+W)/(Co+Cu)$\geq$1.5 in this composition.

These high Cr steels disclosed in these prior documents were welded by the shielded metal arc welding method or the TIG welding method. However, when these high Cr steels are welded by these welding methods, the welding efficiency worsens.

A gas metal arc welding method (abbreviated as "GMA welding method" below) is well known as a welding method having a high welding efficiency, compared with the shielded metal arc welding method and the TIG welding method. The welding speed of the GMA welding method is approximately 10 times as fast as the welding speed of the shielded metal arc welding method and the TIG welding method. Therefore, in order to decrease the manufacturing cost of the generator boiler, it is desired to adopt the GMA welding method for high Cr steels.

In the GMA welding method, the circumference of an arc is shielded by inert gas such as Ar, etc. or carbon dioxide. In order to stabilize the arc, it is well known that the shielding gas necessarily contains a certain amount of oxygen. However, when a high Cr steel is welded, and the oxygen concentration in the shielding gas is high, the toughness of welded materials decreases. Therefore, the fact that the GMA welding method has been practically adopted for high Cr steels has not been reported.

In consideration of the above described problems with conventional technology, it is an object of the present invention to provide a weld material which contains 8 to 13% Cr, and can be used with the GMA welding method, a GMA welding method which has superior arc stability and can provide a welded material having superior properties, and a welded structure.

SUMMARY OF THE INVENTION

Figure 1:
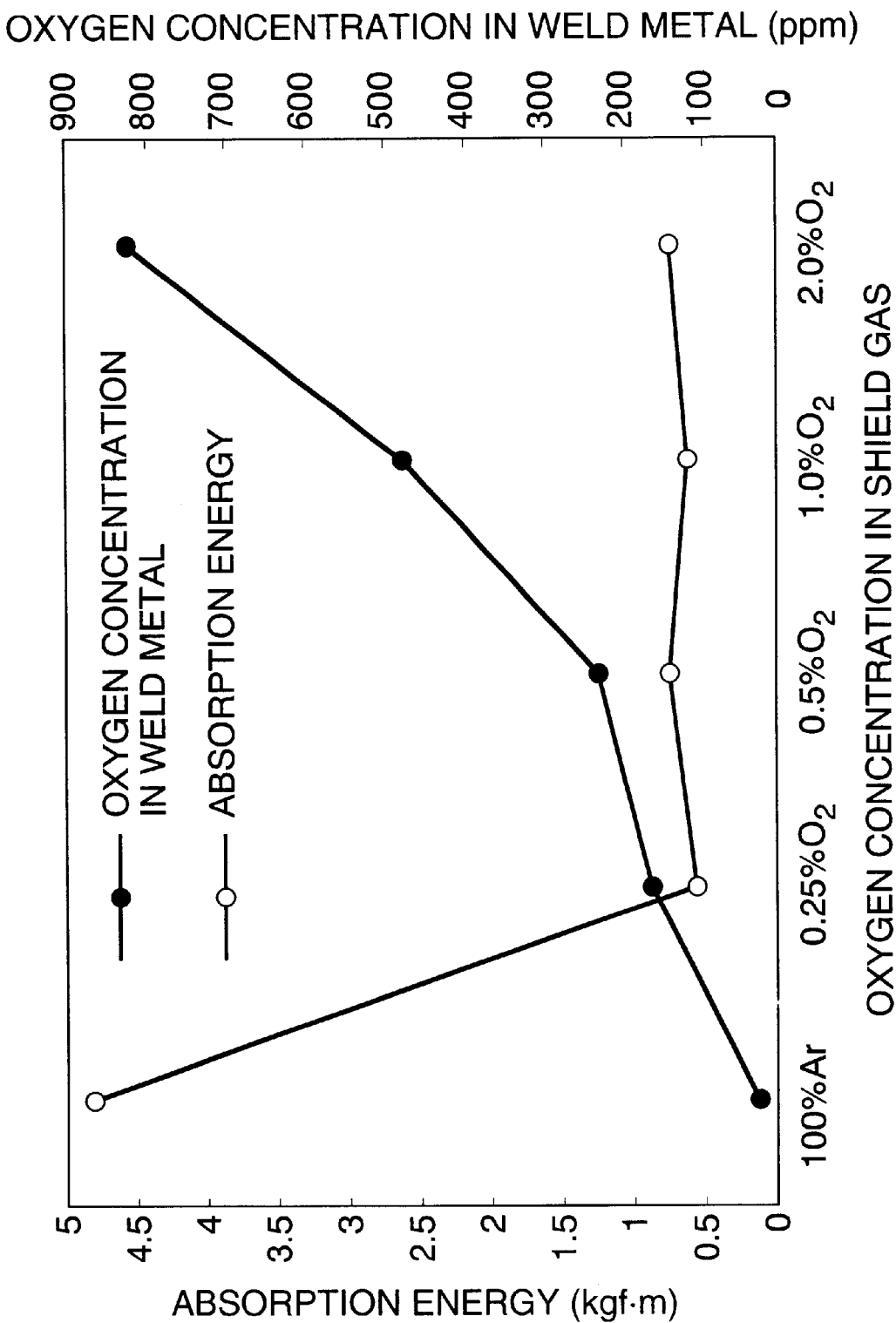
FIG. 1 is a graph showing the relationship between an oxygen concentration in a shield gas and an absorption energy and an oxygen concentration in the weld metals

As a result of a detailed examination of the components of weld materials, the inventors of the present invention founded that the sufficient arc stability under the conditions in which an oxygen concentration in the shield gas is low can be obtained by adding rare earth metal elements (abbreviated as "REMs" below), and if necessary, furthermore adding calcium or magnesium to weld materials. Moreover, the inventors founded that the fluidity of weld materials is improved by adding an optimum amount of cobalt to weld materials; therefore, the bead formed at the open end of one weld metal smoothly reaches, and is in intimate contact with, the open end of the other weld metal.

The weld material of the present invention is based on the above finding, and containing 0.01 to 0.15% C, 0.1 to 0.6% Si, 0.1 to 2.0% Mn, 8 to 13% Cr, 0.1 to 1.5% Ni, 0.3 to 2.0% Mo, 0.05 to 0.5% V, 0.08 to 0.5% W, 0.5 to 5.0% Co, 0.1 to 0.5% Ta, $\geq$0.08% N, 0.01 to 0.1% REMs, and consisting of the balance Fe with inevitable impurities. Moreover, "%" means "weight %".

Below, the reasons for the limitation of the percentage contents of the components of the weld material of the present invention will be explained.

[C: 0.01 to 0.15%]

When C forms carbide or carbide nitride along with carbide forming elements such as Cr; Mo, W, etc., the creep strength of the weld material can be improved. Moreover, the hardenability can also be improved. However, if the percentage content of C is less than 0.01%, these effects cannot be sufficiently obtained. In contrast, when it exceeds 0.15%, cracks are easily generated. Therefore, the weld material of the present invention contains 0.01 to 0.15% of C, and preferably 0.06 to 0.12%.

[Si:0.1 to 0.6%]

Si works as a deoxidizer, and improves the oxidation resistance of the weld material at high temperatures. When the weld material containing Si is welded by the GMA welding method, the fluidity of the molten weld material is improved, whereby the shape of the bead is suitable for welding. This is effective for preventing the generation of weld defects. Therefore, the weld material of the present invention contains 0.1% or more of Si. However, when the weld material contain excess Si, the toughness of the weld metal decreases. Therefore, the weld material of the present invention contains 0.1 to 0.6% of Si.

[Mn: 0.1 to 2.0%]

Mn works as a deoxidizer, similar to Si. In addition, Si improves the strength of the weld material. However, when the weld material contains excess amounts of Mn, the toughness of the weld metal decreases, similarly to Si. Therefore, the weld material contains 0.1 to 2.0% of Mn. Moreover, in order to maintain the strength, the weld material preferably contains 0.5% or more of Mn.

[Cr: 8 to 13%]

Cr is an effective element for maintaining the oxidation resistance of weld metals. In order to maintain the oxidation resistance of the weld material under conditions in which the temperature and pressure are high, the weld material contains 8% or more of Cr. However, if the weld material contains excess amounts of Cr, δ-ferrite crystallizes in weld metals, whereby the toughness decreases. Therefore, the upper limitation of the percentage content of Cr is set at 13%. The weld material of the present invention preferably contains 8.5 to 11% of Cr.

[Ni: 0.1 to 1.5%]

Ni is an effective element for preventing the generation of ferrite, and improving the toughness of weld metals. As explained above, one object of the present invention is to provide a weld material suitable for materials constructing members subject to high temperatures for long periods. Therefore, Ni is particularly important for the weld *material of the present invention. When the weld material contains less than 0.1% of Ni, the weld material cannot sufficiently resist high temperatures for long periods. In contrast, if the weld material contains more than 1.5% of Ni, the Ac, transformation point is lowered, whereby an austenite phase is generated by the heat treatment after welding, and the high temperature creep properties deteriorates. Therefore, the weld material of the present invention contains 0.1 to 1.5% of Ni, preferably 0.3 to 0.7%.

[Mo: 0.3 to 2.0%]

When Mo is solution treated in a base, the high temperature creep strength of the weld material is improved. In order to obtain such an effect, it is necessary for the weld material to contain 0.3% or more of Mo. However, when the percentage content of Mo is excessive, δ-ferrite is generated, whereby the toughness decreases. Therefore, the upper limitation of the percentage content of Mo is set at 2.0%. The weld material of the present invention preferably contains 0.8 to 1.2% of Mo.

[Cu: 0.5 to 4.0%]

Cu is an effective element for preventing the generation of δ-ferrite, and improving the toughness of weld metals. Moreover, Cu can decrease the Cr equivalent of the weld material, whereby Cu decreases the high temperature crack susceptibility. Cu is contained optionally in the weld material. In order to sufficiently obtain such an effect, it is necessary that the percentage content of Cu with respect to the weld material is 0.5% or more. However, in contrast, when the percentage content of Cu is excessive, the $A_{c1}$ transformation point is lowered, whereby the tempering at high temperatures cannot be carried out. Such a weld material is not of practical use. Therefore, the weld material of the present invention contains 4.0% or less of Cu, preferably in a range from 1.0 to 2.0%.

[V: 0.05 to 0.5%]

V forms carbide nitride, along with C and N, whereby improves the creep strength of the weld material. In order to obtain such an effect, it is necessary for the weld material to contain 0.05% or more of V. In contrast, when the percentage content of V is excessive, the carbide nitride is bulky and the creep strength decreases. Therefore, the weld material of the present invention contains 0.5% or less of V, preferably in a range from 0.1 to 0.3%.

[W: 0.08 to 0.5%]

Similar to Mo, when W is solution treated in a base, the high temperature creep strength of the weld material is improved. In order to obtain such an effect, it is necessary for the weld material to contain 0.08% or more of W. However, when the percentage content of W is excessive, δ-ferrite is generated, and the toughness of the weld a metal decreases. Therefore, the upper limitation of the percentage content of W is set at 0.5%. The weld material of the present invention preferably contains 0.1 to 0.3% of W.

[Co: 0.5 to 5.0%]

Similar to Si, Co improves the fluidity of the molten weld metal, whereby it the shape of the bead is suitable for welding. Moreover, Co prevents the generation of δ-ferrite, and improves the toughness of the weld metal. Furthermore, Co decreases the Cr equivalent, whereby decrease the high temperature cracking while welding. Therefore, the weld material of the present invention contains 0.5% or more of Co. However, when the weld material contains excessive Co, the $A_{C1}$ transformation point is lowered, whereby the tempering at high temperatures cannot be carried out. Such weld material is not practical use. In addition, the cost of the weld material increases. Therefore, the weld material of the present invention contains 5.0% or less of Co, preferably in a range from 1.5 to 3.5%.

[Ta: 0.1 to 0.5%]

Ta forms carbide, along with C, whereby it improves the high temperature strength and the creep strength of the weld material. In order to obtain such effects, it is necessary for the weld material to contain 0.1% or more of Ta. In contrast, when the percentage content of Ta is excessive, the toughness decreases. Therefore, the weld material of the present invention contains 0.5% or less of Ta, preferably in a range from 0.15 to 0.3%.

[N: 0.08% or less]

When N forms nitride or is solution treated in a base, the high temperature strength and the creep strength of the weld material are improved. However, when the percentage content of N is excessive, excess amounts of nitride are formed, whereby the toughness decreases, and the creep strength decreases for long periods. These cause the generation of blow holes. Therefore, the weld material of the present invention contains 0.08% or less of N, preferably in a range from 0.01 to 0.04%.

[REMs: 0.01 to 0.1%]

In order to stabilize an arc in inert gas containing no or a low concentration of oxygen, REMs are contained. In other words, in order to stabilize the arc, it is necessary to stabilize the arc spot, that is a cathode spot, or to move stably a droplet.

Oxides of REMs have a work function and a formation free energy, which are smaller than those of the other oxides, whereby REMs easily change into oxides. During welding, minimum amounts of oxygen contained in the weld material react REMs and easily form oxides of REMs. The oxides of REMs work as a cathode spot. Therefore, when the weld material contains REMs, the droplet can move stably.

In consideration of the above viewpoint, the weld material of the present invention contains 0.01% or more of REMs. However, when the percentage content of REMs is excessive, the high temperature crack susceptibility increases. Moreover, when the excess amounts of oxides of REMs are formed at the surface of the molten metal, the shape of bead is unsuitable for welding, whereby the toughness decreases. Therefore, the weld material of the present invention contains 0.1% or less of REMS, preferably in a range from 0.03 to 0.08%.

The weld material of the present invention can contain any kinds of REMS. In the present specification, REMs mean Y and at least one lanthanoid element. In consideration of the cost of the weld material, it is preferable to contain mesh metals rather than pure REMS.

[Ca or Mg: 0.0005 to 0.02%]

Similar to REMs, in order to stabilize an arc in inert gas containing no or a low concentration of oxygen, Ca is contained optionally in the weld material. The work function of calcium oxide is extremely low. Therefore, in order to stabilize the arc, the weld material of the present invention contains 0.0005% or more of Ca. However, when the percentage content of Ca is excessive, an oxide film comprising Ca is easily generated at the surface of a bead, whereby the shape of the bead is not suitable for welding. Therefore, the weld material of the present invention contains 0.02% or less of Ca.

Similar to REMs and Ca, in order to stabilize an arc in inert gas containing none or low concentration oxygen, Mg is contained optionally in the weld material. Moreover, Mg fixes Si, and it improves the hot working. Therefore, Mg is useful for weld materials. However, when the weld material contains excess amounts of Mg, the oxide film is easily formed at the surface of a bead, and the shape of the bead is unsuitable for welding. Therefore, the weld material of the present invention contains 0.02% or less of Mg.

Moreover, the Cr equivalent (Cr eq.=Cr+6Si+4Mo+ 1.5W+11V−40C−30N 2Co−Cu−4Ni−2Mn (%)) of the weld material according to the present invention is preferably 10% or less. For example, when the narrow open ends of thick members used for generator boilers are welded, the reaction stress is large. Therefore, when the thick member is made by conventional weld materials, high temperature cracks sometimes are generated while welding. However, when the Cr equivalent is set at 10% or less of the weld material according to the present invention, the generation of δ-ferrite residue is prevented, whereby the toughness of the weld metal is improved. The properties needed for good weld materials can be obtained by setting the Cr equivalent of the weld material of the present invention to 5% or less.

The weld material of the present invention contains P and S as impurities. However, the percentage contents of P and S are preferably set at 0.005% or less and 0.003% or less, respectively. Moreover, the weld material of the present invention contains O as impurities. O exerts a bad influence on the toughness of the weld material, therefore, the percentage content of O is preferably set at 0.01% or less.

Below, the GMA welding method using the weld material of the present invention will be explained.

Welding wires made of the weld material of the present invention are used. In general, inert gas, Ar, is used as a shield gas. However, in order to improve the stability of an arc, mixture gas containing Ar and He is preferably used as a shield gas. Shield gas preferably contains 20 to 50% of He, in volume.

In conventional GMA welding methods, in order to obtain a stability of an arc, a very small quantity of oxygen is contained in the shield gas. However, when the shield gas contains oxygen, the oxygen amount of the weld metal increases, whereby the toughness decreases. FIG. 1 shows the relationship between oxygen concentration in a shield gas and absorption energy and an oxygen concentration in the weld metals. As shown in FIG. 1, when the oxygen concentration in the shield gas increases, the oxygen concentration in the weld metals tends to increase. However, the absorption energy is subsequently fixed when the oxygen concentration in the shield gas is 0.25% or more. Therefore, in consideration of the toughness of the weld metal, the oxygen concentration in the shield gas is preferably 0.25% or less. Moreover, after the present inventors have been studied, the fact, that the arc stability when the oxygen concentration in the shield gas is 0% substantially equals to the arc stability when it is 0.25%, is founded. Therefore, the oxygen concentration in the shield gas is more preferably 0%.

After welding, annealing for removing stress is carried out. The annealing is preferably carried out in a range from 750 to 780° C. When the annealing is carried out at 750° C. or more, the toughness of the weld metal can be improved. However, the annealing is carried out at excessive high temperatures, the high temperature strength decreases. Therefore, the annealing is preferably carried out in a range from 750 to 780° C. The annealing periods can be fixed depending on the annealing temperature. However, in general, an annealing period is sufficient for 1 to 5 hours.

DETAILED DESCRIPTION OF THE PREFERRED EMBODIMENTS

Next, embodiments of the present invention will be explained.

First, the welding wires comprising the components shown in Table 1 below were prepared.

TABLE 1

(% by weight)

| Wire No. | C | Si | Mn | P | S | Ni | Cr | Mo | Cu | W | Ta | N | V | Co | Ce | Fe | Cr eq. | Note |
|---|---|---|---|---|---|---|---|---|---|---|---|---|---|---|---|---|---|---|
| 1 | 0.08 | 0.21 | 0.4 | 0.005 | 0.003 | 0.41 | 9.7 | 0.8 | 0.03 | 0.2 | 0.17 | 0.007 | — | — | — | Bal. | 8.63 | Com. Ex. |
| 2 | 0.1 | 0.42 | 1.0 | 0.003 | 0.001 | 0.01 | 9.0 | 1.0 | 0.01 | 0 | — | 0.027 | 0.2 | — | 0.05 | Bal. | 11.2 | Com. Ex. |
| 3 | 0.08 | 0.3 | 1.2 | 0.003 | 0.001 | 0.4 | 9.2 | 1.0 | 1.5 | 0.2 | 0.2 | 0.027 | 0.2 | — | 0.05 | Bal. | 8.33 | Com. Ex. |
| 4 | 0.08 | 0.3 | 1.2 | 0.003 | 0.001 | 0.4 | 9.2 | 1.0 | 1.5 | 0.2 | 0.2 | 0.027 | 0.2 | 2.0 | 0.05 | Bal. | 4.33 | Ex. |

The welding wires were prepared by melting the weld material in a vacuum melting furnace, forging, rolling, and drawing. The obtained wires were welded by the GMA welding method. The welding conditions are below.

Welding current: 220 to 260 (A)

Welding voltage: 27 to 30 (V)

Shield gas: Mixture gas containing, in volume, 65% of Ar and 35% He

While welding, the arc behavior, the bead shape (appearance of bead surface), the generation of cracks, and the conditions of open ends of the wires were evaluated by visual observing the surface and the cutting surface of the wires.

Bead meandering is observed between the open ends of the wire No. 1 during the wire No. 1 was groove welded by raying the arc at the open ends. Therefore, the arc does not reach at the whole open ends, whereby an incomplete penetration is generated. Bead meandering is not observed between the open ends of the wire No. 2. However, the arc behavior suddenly becomes unstable at the top surface of the open ends. As a result, the bead sometimes meanders. During the open ends were groove welded, the cracks which can be supposed that they are generated due to high temperatures were observed at the center area in the first layer and the second layer of the bead. Groove welding of the wire No. 3 can be substantially stably carried out at the whole layers. However, the high temperature cracks sometimes were generated at the second layer. The wire No. 4 is welded stably at the whole layers. Moreover, the bead shape and the penetration at the open ends were good. These results were shown in Table 2 below.

TABLE 2

| Wire No. | Diameter of Wire (mm) | Bead shape | Penetration at Open ends | Crack-ing | Note |
|---|---|---|---|---|---|
| 1 | 1.2 | x | x | — | Welded bead meanders, whereby a incomplete penetration is generated. |
| 2 | 1.6 | Δ | ○ | Δ | Arc is unstable at the open ends. |
| 3 | 1.2 | ○ | ○ | ○ | |
| 4 | 1.2 | ◎ | ○ | ◎ | Fluidity of the weld metal is superior, whereby the bead shape and the penetration condition at the open ends are good. |

In Table 2, ◎ means superior, ○ means normal, Δ means slight inferior, and x means inferior.

The relationship between the oxygen concentration in the shield gas and the oxygen concentration in the weld metal and the absorption energy were examined using the wire No. 4 and changing the oxygen concentration in the shield gas into 0%, 0.25%, 0.5%, 1.0%, and 2.0%, respectively. These results were shown in FIG. 1. Moreover, the welding conditions were aforementioned.

As explained above, the oxygen concentration in the weld metal increases, in proportion to the oxygen concentration in the shield gas, as shown in FIG. 1. Specifically, the oxygen concentration in the weld metal was 15 ppm when the oxygen concentration in the shield gas was 0%. However, the oxygen concentration in the weld metal increases to 156 ppm when the oxygen concentration in the shield gas was 0.25%.

Moreover, the absorption energy was large, 4.5 kgf·m or more when the oxygen concentration in the shield gas is 0% and the oxygen concentration in the weld metal was 15 ppm. That is, the toughness was superior at the conditions. However, when the oxygen concentration in the shield gas was 0.25% or more and the oxygen concentration in the weld metal was about 156 ppm, the absorption energy decreases suddenly to 0.8% or less. That is, the toughness suddenly decreases.

When the arc stability was observed during welding, it was confirmed that the arc stability when the oxygen concentration in the shield gas is 0% substantially equals the arc stability when the oxygen concentration in the shield gas is 0.25%. Therefore, when the toughness is considered, the oxygen concentration in the shield gas is preferable 0%.

Next, the absorption energy and the hardness of the wire No. 4 were measured by welding the wire No. 4 under conditions in which the oxygen concentration in the shield gas was 0%, annealing under conditions shown in Table 3 in order to remove the stress. The results were shown in Table 3. As shown in Table 3, when the annealing temperature rises and the annealing period increase, the absorption energy increases, that is, the toughness increases. Moreover, the absorption energy shown in Table 3 is an average value of three wires No. 4, and the hardness is an average value of five ones.

TABLE 3

| Annealing conditions | Absorption energy (kgf · m) | Hardness (HV) |
|---|---|---|
| 740° C. for 2 hours | 2.85 | 284 |
| 760° C. for 2 hours | 5.63 | — |
| 760° C. for 4 hours | 10.43 | 244 |

The influences of the annealing conditions to the absorption energy and the hardness of the weld base material were examined. The results were shown in Table 4 below.

TABLE 4

| Annealing conditions | Absorption energy (kgf · m) | Hardness (HV) |
|---|---|---|
| 740° C. for 2 hours | 6.05 | 275 |
| 760° C. for 4 hours | 6.57 | 249 |

The absorption energy of the weld base material does not change as much as the absorption energy of the weld metal, when the annealing conditions change. The absorption energy of the weld metal is larger than that of the weld base material under conditions in which the annealing temperature is 760° C. and the annealing period is 4 hours.

The hardness of the weld base material under conditions in which the annealing temperature is 760° C. and the annealing period is 4 hours is smaller than the hardness of the weld base material under conditions in which the annealing temperature is 740° C. and the annealing period is 2 hours. The difference of hardness of the weld base material under these conditions is approximately half with respect to the difference of hardness of the weld metal under these conditions. In other words, the difference of hardness of the weld base material was 26 HV, in contrast, the difference of hardness of the weld metal was 40 HV The weld base material is tempered at 770° C. and welded before annealing; therefore, the metallographic structure of the weld base material is sufficiently stable. In contrast, the weld metal is only welded before annealing, It can be believed that such difference of the heat treatments causes the difference of hardness.

Tensile strength of the weld metal which was annealed at 760° C. for 2 hours, in order to remove the stress was measured at 600° C. and 650° C. The results were shown in Table 5 below.

TABLE 5

| | Tensile strength at 600° C. (kgf · mm$^2$) | Tensile strength at 650° C. (kgf · mm$^2$) |
|---|---|---|
| 760° C. for 2 hours | 43.5 | 33.8 |

Tensile strength at Tensile strength at material. It is confirmed that the weld metal has excellent tensile strength.

Next, the wires having a composition shown in Table 6 were prepared, and welded under the aforementioned conditions.

TABLE 6

(% by weight)

| Wire No. | C | Si | Mn | P | S | Ni | Cr | Mo | Cu | W | Ta | N | V | Co | REM | Fe | Cr eq. | Note |
|---|---|---|---|---|---|---|---|---|---|---|---|---|---|---|---|---|---|---|
| 5 | 0.09 | 0.31 | 0.38 | 0.004 | 0.001 | 0.68 | 11.5 | 1.6 | 1.4 | 0.15 | 0.17 | 0.008 | 0.31 | 1.5 | Ce 0.008 | Bal. | 11.68 | Com. Ex. Ce: few |
| 6 | 0.11 | 0.35 | 0.42 | 0.003 | 0.001 | 1.21 | 11.4 | 1.7 | 1.3 | 0.16 | 0.17 | 0.007 | 0.21 | 1.7 | Ce 0.13 | Bal. | 7.86 | Com. Ex. Ce: much |
| 7 | 0.15 | 0.32 | 0.45 | 0.003 | 0.001 | 0.41 | 12.3 | 1.6 | 1.5 | 0.23 | 0.19 | 0.012 | 0.23 | 1.8 | Ce 0.08 | Bal. | 9.5 | Ex. |
| 8 | 0.09 | 0.31 | 0.43 | 0.005 | 0.001 | 0.43 | 8.4 | 1.3 | 2.3 | 0.34 | 0.36 | 0.036 | 0.07 | 2.3 | Ce 0.07 | Bal. | 2.58 | Ex. |
| 9 | 0.12 | 0.35 | 0.45 | 0.005 | 0.002 | 1.31 | 9.3 | 1.1 | 1.4 | 0.43 | 0.32 | 0.056 | 0.32 | 2.3 | Ce 0.08 | Bal. | 1.35 | Ex. |
| 10 | 0.03 | 0.46 | 1.63 | 0.003 | 0.001 | 0.42 | 8.6 | 0.5 | 0.03 | 0.35 | 0.36 | 0.035 | 0.08 | 0.3 | Dy 0.03 | Bal. | 6.95 | Com. Ex. Co: few |
| 11 | 0.04 | 0.47 | 1.34 | 0.005 | 0.003 | 0.41 | 8.7 | 0.7 | 0.01 | 0.32 | 0.34 | 0.023 | 0.09 | 5.2 | Dy 0.07 | Bal. | -1.23 | Com. Ex. Co: much |
| 12 | 0.03 | 0.46 | 1.83 | 0.003 | 0.001 | 0.68 | 8.5 | 0.7 | 0.01 | 0.36 | 0.35 | 0.035 | 0.11 | 3.5 | Dy 0.08 | Bal. | 0.17 | Ex. |
| 13 | 0.03 | 0.31 | 0.43 | 0.003 | 0.002 | 0.53 | 10.9 | 1.3 | 1.13 | 0.36 | 0.23 | 0.031 | 0.13 | 3.1 | Dy 0.05 | Bal. | 7.4 | Ex. |
| 14 | 0.07 | 0.2 | 1.23 | 0.003 | 0.003 | 0.56 | 9.2 | 1.8 | 1.21 | 0.42 | 0.27 | 0.065 | 0.41 | 2.8 | Dy 0.05 | Bal. | 6.48 | Ex. |
| 15 | 0.13 | 0.32 | 1.26 | 0.005 | 0.001 | 0.66 | 10.3 | 1.2 | 1.35 | 0.41 | 0.05 | 0.035 | 0.38 | 2.5 | Sm 0.06 | Bal. | 4.06 | Com. Ex. Ta: few |
| 16 | 0.08 | 0.43 | 1.34 | 0.003 | 0.001 | 0.67 | 9.6 | 1.4 | 0.78 | 0.33 | 0.83 | 0.041 | 0.35 | 2.6 | Sm 0.06 | Bal. | 6.36 | Com. Ex. Ta: much |
| 17 | 0.08 | 0.22 | 1.02 | 0.001 | 0.001 | 0.56 | 9.26 | 0.34 | — | 0.19 | 0.21 | 0.0059 | 0.21 | 2.5 | Ce 0.05 | Bal. | 1.88 | Ex. Cu: none |
| 18 | 0.09 | 0.2 | 1.04 | 0.001 | 0.001 | 0.67 | 9.1 | 0.3 | — | 0.2 | 0.22 | 0.008 | 0.2 | 2.4 | Ca 0.017 | Bal. | 0.6 | Ex. Ca: contained |
| 19 | 0.08 | 0.16 | 1.01 | 0.001 | 0.001 | 0.55 | 9.19 | 0.4 | — | 0.22 | 0.24 | 0.012 | 0.25 | 2.2 | Mg 0.038 | Bal. | 2.65 | Ex. Mg: contained |

Then, the tests shown in Table 7 were carried out using the prepared wires.

The wire No. 5 contains few Ce which is REMs; therefore, the arc stability is inferior. Then, the bead shape

TABLE 7

| Wire No. | Arc stability | Bead shape | Penetration at Open ends | Cracking | Absorption energy (kgf · m) | Tensile strength at 650° C. (kgf · m²) | Note |
|---|---|---|---|---|---|---|---|
| 5 | X | Δ | ◯ | ◯ | 3.23 | 25.8 | Com. Ex. Ce: few |
| 6 | ⊙ | ◯ | ⊙ | ⊙ | 2.12 | 32.8 | Com. Ex. Ce: much |
| 7 | ⊙ | ⊙ | ⊙ | ⊙ | 6.56 | 32.6 | Ex. |
| 8 | ⊙ | ⊙ | ◯ | ⊙ | 6.34 | 34.2 | Ex. |
| 9 | ⊙ | ⊙ | ⊙ | ⊙ | 6.38 | 33.6 | Ex. |
| 10 | ⊙ | Δ | Δ | Δ | 3.26 | 29.6 | Com. Ex. Co: few |
| 11 | ⊙ | ⊙ | ◯ | ◯ | 2.63 | 26.7 | Com. Ex. Co: much |
| 12 | ⊙ | ⊙ | ◯ | ⊙ | 6.56 | 34.5 | Ex. |
| 13 | ⊙ | ⊙ | ⊙ | ⊙ | 6.43 | 35.6 | Ex. |
| 14 | ⊙ | ◯ | ⊙ | ⊙ | 6.38 | 33.8 | Ex. |
| 15 | ⊙ | ⊙ | ◯ | ⊙ | 4.38 | 21.8 | Com. Ex. Ta: few |
| 16 | ⊙ | ⊙ | ◯ | ⊙ | 3.98 | 23.8 | Com. Ex. Ta: much |
| 17 | ⊙ | ◯ | ⊙ | ⊙ | 2.05 | 30.5 | Ex. Cu: none |
| 18 | ⊙ | ◯ | ⊙ | ⊙ | 2.19 | 32.3 | Ex. Ca: contained |
| 19 | ⊙ | ◯ | ⊙ | ⊙ | 2.30 | 31.5 | Ex. Mg: contained |

In Table 7,
⊙ means superior;
◯ means normal,
Δ means slightly inferior, and
X means inferior.

is slightly inferior. In contrast, the wire No. 6 contains much Ce, the absorption energy, that is the toughness is small. The bead surface of the wire No. 10 containing few Co is uneven. In contrast, the absorption energy of the wire No. 11 containing much Co is small. The wire No. 15 containing few Ta has small tensile strength at 650° C. The wire No. 16 containing much Ta has small tensile strength at 650° C. and absorption energy.

What is claimed is:

1. A weld material containing, in weight, 0.01 to 0.15% C, 0.1 to 0.6% Si, 0.1 to 2.0% Mn, 8 to 13% Cr, 0.1 to 1.5% Ni, 0.3 to 2.0% Mo, 0.05 to 0.5% V, 0.08 to 0.5% W, 0.5 to 5.0% Co, 0.1 to 0.5% Ta, ≦0.08% N, 0.01 to 0.1% REMs, and consisting of the balance Fe with inevitable impurities.

2. A weld material according to claim 1, wherein further contains, in weight, 0.5 to 4.0% Cu.

3. A weld material according to claim 1, wherein further contains, in weight, 0.0005 to 0.02% Ca or Mg.

4. A weld material according to claim 1, wherein Cr equivalent (Cr eq.=Cr+6Si+4Mo+1.5W+11V−40C−30N−2Co−Cu−4Ni−2Mn (%)) is 10% or less.

5. A weld material according to claim 1, wherein contains, in weight, 0.06 to 0.12% C, 8.5 to 11% Cr, 0.3 to 0.7% Ni, 0.8 to 12% Mo, 0.15 to 0.3% V, 0.1 to 3.5% Co, 0.1 to 0.5% Ta, 0.001 to 0.04% N, 0.03 to 0.08% REMs, and consisting of the balance Fe with inevitable impurities.

6. A gas metal arc welding method comprising the step of: welding a wire containing, in weight, 0.01 to 0.15% C, 0.1 to 0.5% Si, 0.1 to 2.0% Mn, 8 to 13% Cr, 0.1 to 5% Ni, 0.3 to 1.5% Mo, 0.05 to 0.5% V, 0.08 to 0.5% W, 0.5 to 5.0% Co, 0.1 to 0.5% Ta, ≦0.08% N, 0.01 to 0.1% REMs, and consisting of the balance Fe with inevitable impurities, using a shield gas containing Ar, He, and 0.25% or less of oxygen with respect to the total volume of the shield gas.

7. A gas metal arc welding method according to claim 6, wherein said shield gas contains, in volume, 20 to 50% of He.

8. A gas metal arc welding method according to claim 6, wherein said wire is annealed in a range of 700 to 800°C. after welding, in order to remove stress.

9. A gas metal arc welding method according to claim 6, wherein said wire further contains, in weight, 0.5 to 4.0% of Cu.

10. A welded structure obtainable by welding a weld material containing, in weight, 0.01 to 0.15% C, 0.1 to 0.6% Si, 0.1 to 2.0% Mn, 8 to 13% Cr, 0.1 to 1.5% Ni, 0.3 to 2.0% Mo, 0.05 to 5% V, 0.08 to b 0.5% W, 0.5 to 5.0% Co, 0.1 to 0.5% Ta, ≦0.08% N , 0.01 to 0.1% REMs, and consisting of the balance Fe with inevitable impurities, using a shield gas containing Ar, He, and 0.25% or less of oxygen with respect to the total volume of the shield gas.

* * * * *